(12) United States Patent
Mathew et al.

(10) Patent No.: US 8,401,265 B2
(45) Date of Patent: Mar. 19, 2013

(54) PROCESSING OF MEDICAL IMAGE DATA

(75) Inventors: Manoj Mathew, Tustin, CA (US); Keiichi Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 12/777,222

(22) Filed: May 10, 2010

(65) Prior Publication Data

US 2011/0274329 A1    Nov. 10, 2011

(51) Int. Cl.
*G06K 9/00* (2006.01)
(52) U.S. Cl. ....................................................... 382/131
(58) Field of Classification Search .................. None
See application file for complete search history.

(56) References Cited

U.S. PATENT DOCUMENTS

| | | | |
|---|---|---|---|
| 7,079,700 B2 | 7/2006 | Shinbata | |
| 7,177,481 B2 | 2/2007 | Kaji | |
| 2005/0134734 A1* | 6/2005 | Adams et al. ................. | 348/518 |
| 2008/0152251 A1 | 6/2008 | Florent et al. | |
| 2009/0034868 A1 | 2/2009 | Rempel et al. | |
| 2009/0074276 A1* | 3/2009 | Doi et al. ..................... | 382/130 |

OTHER PUBLICATIONS

Farbman, Z., Fattal, R., Lischinski, D.: Convolution pyramids. SIGGRAPH Asia (2011) 175:1-175:8.*
F. Marques, "Multiresolution image segmentation based on compound random fields: Application to image coding", PhD Thesis, Polytechnic University of Catalonia (UPC), Barcelona, Spain, Dec. 1992.
Burt, et al., "The Laplacian Pyramid as a Compact Image Code", IEEE Transactions on Communications, vol. com-31, No. 4, pp. 532-540, Apr. 1983.
P. Burt, "Fast filter transforms for image processing", Computer Graphics and Image Processing, vol. 16, No. 2, pp. 20-51, 1981.
R. Shuler, "Improved Discrete Approximation of Laplacian of Gaussian", Nasa Tech Briefs, Mar. 2004.

* cited by examiner

*Primary Examiner* — Bhavesh Mehta
*Assistant Examiner* — Nirav G Patel
(74) *Attorney, Agent, or Firm* — Fitzpatrick, Cella, Harper & Scinto

(57) ABSTRACT

An anti-aliasing filter comprised by a first filter kernel is applied to the medical image data so as to obtain filtered image data. The filtered image data is downsampled so as to obtain decimated image data, and pixel resolution of the decimated image data is approximately one half of pixel resolution of the image data for the medical image. The decimated image data is upsampled and an interpolation filter is applied so as to obtain interpolated image data. The interpolation filter is comprised by a second filter kernel, and the size of the first kernel is smaller than the size of the second filter kernel. Pixel resolution of the interpolated image data is approximately equal to pixel resolution of the medical image data. Difference image data between the interpolated image data and the medical image data for the medical image is obtained, and the difference image data is displayed.

19 Claims, 9 Drawing Sheets

PROCESSING OF MEDICAL IMAGE DATA

FIELD

The present disclosure relates to processing medical image data, and more particularly relates to processing medical image data using downsampling and image filters.

BACKGROUND

In the field of medical images, it is common to process images of an anatomical feature in order to enhance a low contrast image for clinical study. In particular, medical image data is often of low contrast, such that differences in the image are hard to detect by the human eye. Thus, the difference between a pixel of the image with the highest intensity and a pixel of the image with the lowest intensity is often very small. To enhance the image contrast, a series of filters can be used.

In one method, the medical image is processed using a technique known as image pyramiding. A first pyramid, which is sometimes called a Gaussian pyramid, is constructed by repetitive applications of anti-aliasing filtering followed by downsampling, which results in a series of different Gaussian images. A second pyramid, which is sometimes called a Laplacian pyramid, is constructed by obtaining a difference between (a) an upsampled and interpolation-filtered version of one of the Gaussian images and (b) the Gaussian image of the corresponding size. An output higher-contrast image can then be constructed from every level of the Gaussian and Laplacian images.

Typically, the filters of the Gaussian pyramid are symmetrical to the filters of the Laplacian pyramid. More specifically, it is often the case that the size of the anti-aliasing filter is the same as the size of the interpolation filter, and in particular that both are 5×5 pixels. The symmetric 5×5 pixel filters allow for calculation of difference data at relatively low computational cost as compared to larger filters.

SUMMARY

One difficulty with symmetrical 5×5 filters manifests itself in particular where the image data is medical image data of an anatomical feature, such as DR, CT, PET, MRI, or sonogram medical image data. For such medical image data, application of an anti-aliasing filter having a size of 5×5 typically results in blur and/or loss of minute image details which are critical to medical diagnoses and examination. For example, due to the influence of neighboring pixels, a 5×5 anti-aliasing filter may blur the value of a cancerous pixel into the values of nearby non-cancerous pixels.

The foregoing situation is addressed by applying asymmetrical anti-aliasing and interpolation kernel filters, in which the size of the anti-aliasing filter kernel is smaller than the size of the interpolation filter kernel.

Thus, in an example embodiment described herein, medical image data for pixels of a medical image of an anatomical feature are processed by applying an anti-aliasing filter to the medical image data so as to obtain filtered image data. The anti-aliasing filter is comprised by a first filter kernel having weights that define an anti-aliasing filter. The filtered image data is downsampled so as to obtain decimated image data, and pixel resolution of the decimated image data is approximately one half of pixel resolution of the image data for the medical image. The decimated image data is upsampled and an interpolation filter is applied so as to obtain interpolated image data. The interpolation filter is comprised by a second filter kernel having weights that define an interpolation filter, and the size of the first kernel is smaller than the size of the second filter kernel. Pixel resolution of the interpolated image data is approximately equal to pixel resolution of the medical image data for the medical image. Difference image data between the interpolated image data and the medical image data for the medical image is obtained at each of the respective pixels thereof. The difference image data is displayed.

By applying filter kernels having different sizes, it is typically possible to improve the visibility of minute details in a medical image. For example, it typically becomes possible to detect high frequency areas indicating a tumor because such data is retained during image processing. Moreover, by applying an anti-aliasing filter having a smaller kernel size, undue blur is generally avoided.

In an example embodiment, the anti-aliasing filter kernel consists of a 3×3 filter kernel. In a further example, the weights for the 3×3 filter kernel for the anti-aliasing filter are expressed as follows:

$$[k1*[k1,k2,k1],k2*[k1,k2,k1],k1*[k1,k2,k1]] \quad \text{Equation (1)}$$

where the weights satisfy conditions as follows:

$$k1=(\tfrac{1}{4})*w2 \quad \text{Equation (2)}$$

$$k2=1-k1*2 \quad \text{Equation (3)}$$

$$0.8<=w2<=1.3 \quad \text{Equation (4)}$$

$$57\%<=wt\%<=84\% \quad \text{Equation (5)}$$

wherein wt % is the weight of the pixel under consideration, and is defined as follows:

$$wt\%=100*(4*k1*k2+k2*k2) \quad \text{Equation (6)}$$

By using a 3×3 filter kernel, it is typically possible to decrease the influence of neighboring pixels, and thereby to retain minute details of the pixel under consideration and thereby the image. Furthermore, since the anti-aliasing filter is smaller, image processing is typically performed more quickly. In addition, by parametrically generating the weights for the filter kernel subject to the constraints above, aliasing effects in the image can typically be reduced.

In some example embodiments, the interpolation filter kernel consists of a 5×5 filter kernel. In a further example, the weights for the 5×5 filter kernel for the interpolation filter are expressed as follows:

$$[k1*[k1,k2,k3,k2,k1],k2*[k1,k2,k3,k2,k1],k3*[k1,k2,k3,k2,k1],k2*[k1,k2,k3,k2,k1],k1*[k1,k2,k3,k2,k1]] \quad \text{Equation (7)}$$

where the weights satisfy conditions as follows:

$$k1=(\tfrac{1}{16})*w1 \quad \text{Equation (8)}$$

$$k2=\tfrac{1}{4} \quad \text{Equation (9)}$$

$$k3=(\tfrac{1}{2})-k1*2. \quad \text{Equation (10)}$$

In one example embodiment, w1=0.8. In another example embodiment, w1=1.0.

In still another example embodiment, the steps of applying an anti-aliasing filter, downsampling, upsampling and applying an interpolation filter, and obtaining difference image data, are pyramided and applied repeatedly.

In some embodiments, composed medical image data is obtained. The composed medical image data is obtained by upsampling and applying an interpolation filter to the medical image data so as to obtain second interpolated image data, and by obtaining addition image data between the difference image data and the second interpolated image data.

In example embodiments, one or more subsequent image processing techniques are applied to the difference image data. The subsequent image processing techniques include at least noise reduction, artifact reduction, tone processing, local contrast correction and edge enhancement.

In some example embodiments, the medical image data is comprised of radiological or digital radiological (DR) image data of an anatomical feature, the medical image is comprised of computed tomography (CT) image data of an anatomical feature, the medical image data is comprised of a positron emission tomography (PET) image data of an anatomical feature, the medical image data is comprised of magnetic resonance imaging (MRI) or nuclear magnetic resonance imaging (NMRI) image data of an anatomical feature, or the medical image data is comprised of sonogram image data of an anatomical feature obtained by ultrasonography.

This brief summary has been provided so that the nature of this disclosure may be understood quickly. A more complete understanding can be obtained by reference to the following detailed description and to the attached drawings.

DETAILED DESCRIPTION

Figure 1:
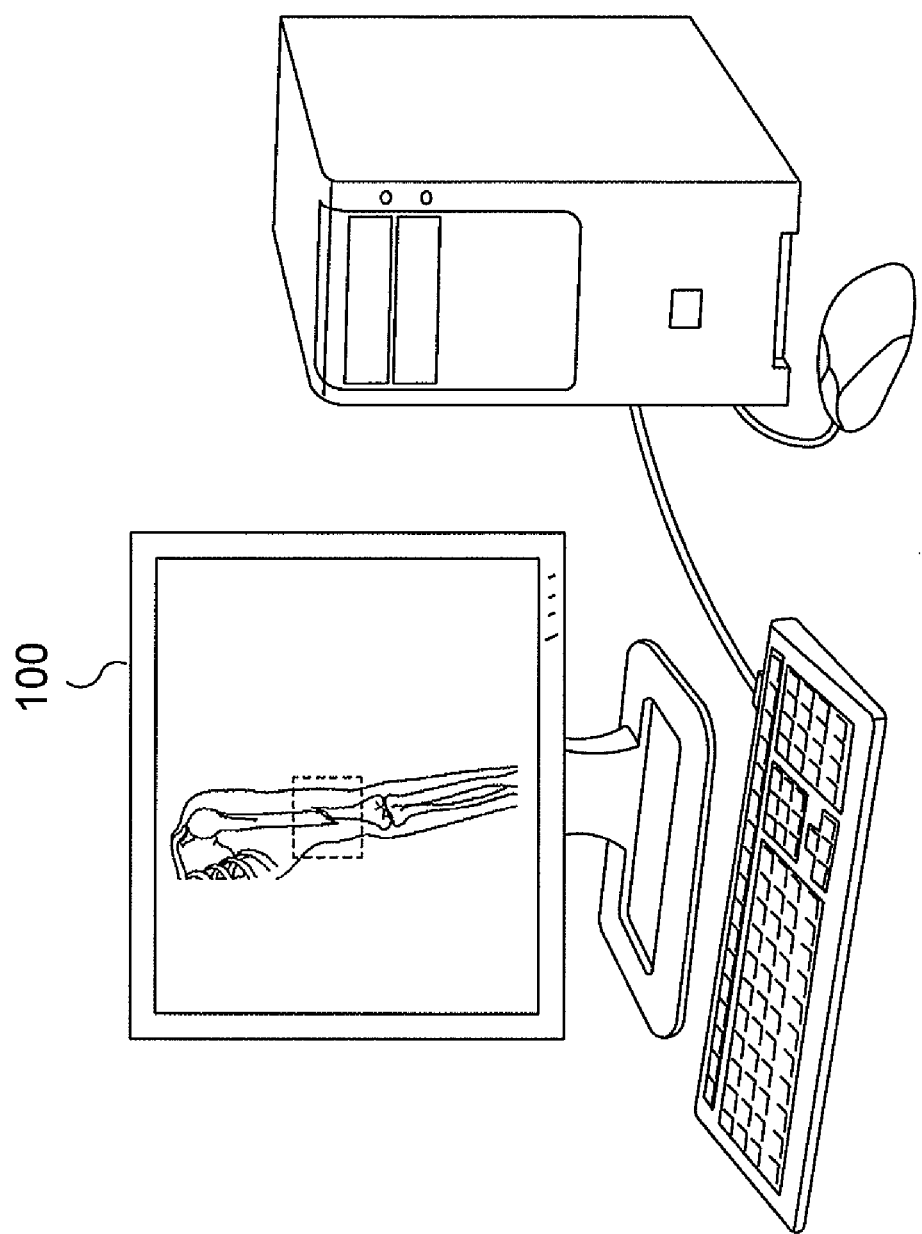
FIG. 1 illustrates an example embodiment of an environment in which aspects of the present disclosure may be practiced.

FIG. 1 illustrates an example environment in which aspects of the present disclosure may be practiced. Computer 100 generally comprises a programmable general purpose personal computer having an operating system, such as Microsoft® Windows® or Apple® Mac OS® or LINUX, and which is programmed as described below so as to perform particular functions and, in effect, become a special purpose computer when performing these functions. Computer 100 includes a display screen, a keyboard for entering text data and user commands, and a pointing device. The pointing device preferably comprises a mouse for pointing and for manipulating objects displayed on the display screen.

Computer 100 also includes computer-readable memory media, such as fixed disk 45 (shown in FIG. 2), which is constructed to store computer-readable information, such as computer-executable process steps or a computer-executable program for causing computer 100 to perform image processing for pixels of a medical image of an anatomical feature, as described below. In some embodiments, computer 100 includes a disk drive (not shown), which provides a means whereby computer 100 can access information, such as image data, computer-executable process steps, application programs, etc., stored on removable memory media. In an alternative, information can also be retrieved through other computer-readable media such as a USB storage device connected to a USB port (not shown), or through a network interface (not shown). Other devices for accessing information stored on removable or remote media may also be provided.

Computer 100 may also acquire image data from other sources, such as output devices including a digital camera, an X-ray machine, a CT scanner, a PET machine, an MRI machine, or a sonographic machine. Image data may also be acquired through a local area network or the Internet via a network interface.

While FIG. 1 depicts a computer, computing equipment for practicing aspects of the present disclosure can be implemented in a variety of embodiments. For example, computer 100 can be embodied as a number of devices, including, for example, a personal digital assistant (PDA), a cellular telephone, a digital camera, a digital video recorder or a portable media player. In a medical image processing environment, the computing equipment can be embodied as a CT scanner, an X-ray machine or an MRI machine, among many other embodiments.

Figure 2:
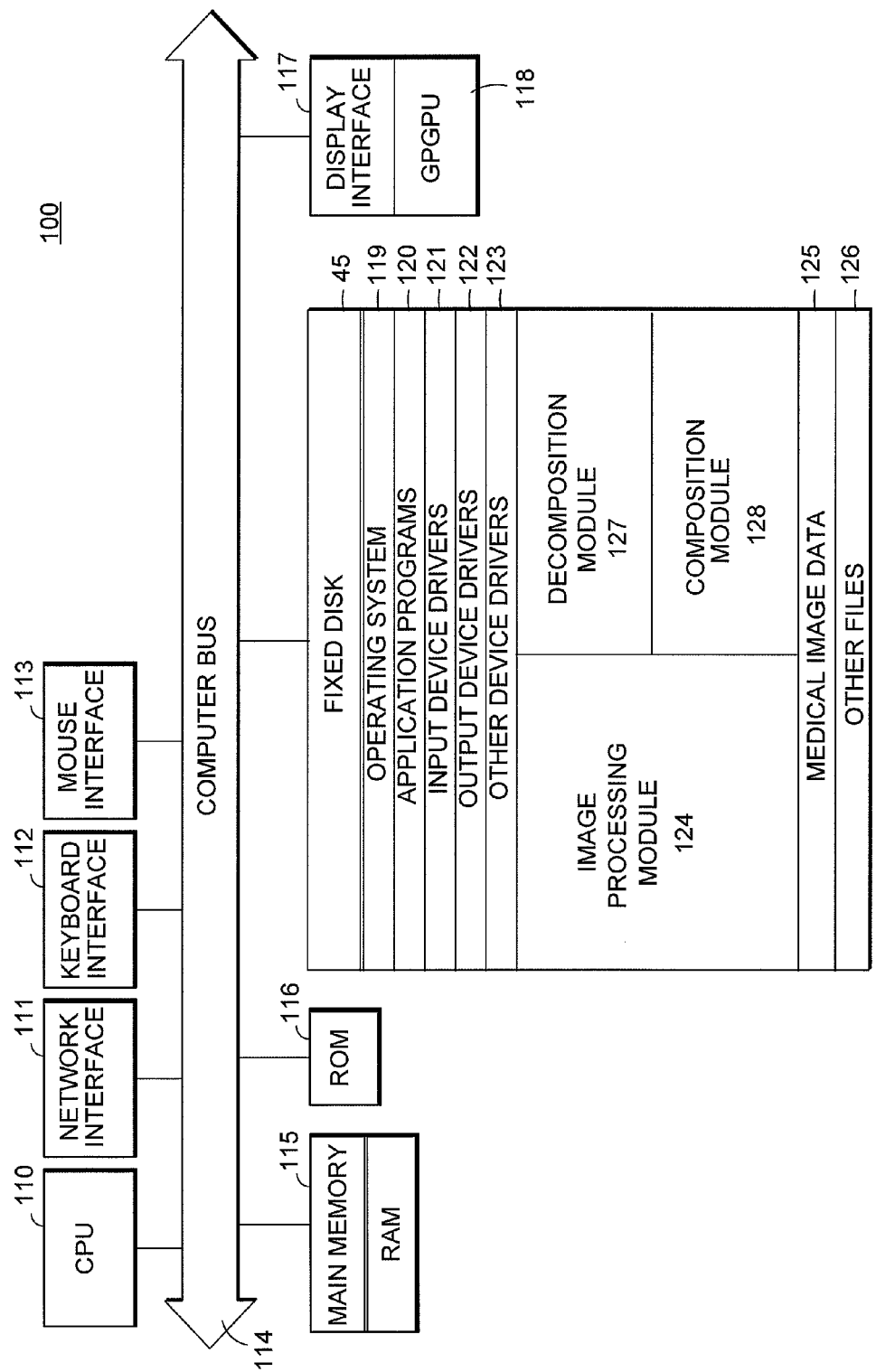
FIG. 2 is a detailed block diagram depicting the internal architecture of the computer shown in FIG. 1.

FIG. 2 is a detailed block diagram depicting the internal architecture of the computer 100 shown in FIG. 1. As shown in FIG. 2, computer 100 includes central processing unit (CPU) 110 which may be a multi-core CPU and which interfaces with computer bus 114. Also interfacing with computer bus 114 are fixed disk 45 (e.g., a hard disk or other nonvolatile computer-readable storage medium), network interface 111 for accessing other devices across a network, keyboard interface 112 for a keyboard, mouse interface 113 for a pointing device, random access memory (RAM) 115 for use as a main run-time transient memory, read only memory (ROM) 116, and display interface 117 for a display screen or other output.

GPGPU 118 is a general-purpose graphics processing unit (GPU), a parallel-processing device that is ordinarily designed to render computer graphics, and that also performs calculations for non-graphics data traditionally handled by a CPU. GPGPU 118 may have a SIMD architecture. SIMD, short for single instruction-multiple data stream, is a type of parallel computing architecture that allows a single computer instruction to perform an identical action simultaneously on multiple pieces of data using multiple processing units.

RAM 115 interfaces with computer bus 114 so as to provide information stored in RAM 115 to CPU 110 during execution of the instructions in software programs, such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data, such as medical image data 125, filter data, and other information, can be stored in RAM 115 so that the data can be accessed by CPU 110 during the execution of the computer-executable software programs, to the extent that such software programs have a need to access and/or modify the data.

As also shown in FIG. 2, fixed disk 45 contains computer-executable process steps for operating system 119, and application programs 120, such as image management programs. Fixed disk 45 also contains computer-executable process steps for device drivers for software interface to devices, such as input device drivers 121, output device drivers 122, and other device drivers 123.

Medical image data 125 is available for image processing, as described below. Other files 126 are available for output to output devices and for manipulation by application programs.

In this embodiment, medical image data 125 comprises image data for pixels of a medical image of an anatomical feature. In particular, the medical image data is comprised of radiological or digital radiological (DR) image data of an anatomical feature. Alternatively, the medical image can be comprised of computed tomography (CT) image data of an anatomical feature, a positron emission tomography (PET) image data of an anatomical feature, a magnetic resonance imaging (MRI) or nuclear magnetic resonance imaging (NMRI) image data of an anatomical feature, or sonogram image data of an anatomical feature obtained by ultrasonography.

Typically, medical image data 125 comprises a black and white image with deeper resolution per pixel, such as 12 bits per pixel, as compared to 8 bit grayscale. In one example embodiment, medical image data 125 follows Digital Imaging and Communications in Medicine (DICOM) standards.

Image processing module 124 comprises computer-executable process steps stored on a computer-readable storage medium such as disk 45 for processing image data, such as medical image data for pixels of a medical image of an anatomical feature. Image processing module 124 processes medical image data such that minute details in the medical image are generally retained and such that undue blur is generally avoided.

More specifically, image processing module 124 is constructed to apply an anti-aliasing filter to the medical image data so as to obtain filtered image data. The anti-aliasing filter is comprised by a first filter kernel having weights that define an anti-aliasing filter. The filtered image data is downsampled so as to obtain decimated image data. The pixel resolution of the decimated image data is approximately one half of pixel resolution of the image data for the medical image. The decimated image data is upsampled, and an interpolation filter is applied so as to obtain interpolated image data. The interpolation filter is comprised by a second filter kernel having weights that define an interpolation filter, and the size of the first kernel is smaller than the size of the second filter kernel. The pixel resolution of the interpolated image data is approximately equal to pixel resolution of the medical image data for the medical image. Difference image data between the interpolated image data and the medical image data for the medical image is obtained, at each of the respective pixels thereof, and the difference image data is displayed. This process will be described in more detail below.

As shown in FIG. 2, image processing module 124 includes, at least, computer-executable process steps for decomposition module 127 and composition module 128.

Decomposition module 127 comprises computer-executable process steps stored on a computer-readable storage medium such as disk 45. Decomposition module 127 is constructed to decompose medical image data, such that the image data is separated into individual frequencies. The operation of decomposition module 127 is discussed in more detail below with respect to FIGS. 4A and 4B.

Composition module 128 comprises computer-executable process steps stored on a computer-readable storage medium such as disk 45. Composition module 128 is constructed to reconstruct medical image data, such that the individual frequencies of the image data are integrated. The operation of composition module 128 is discussed in more detail below with respect to FIGS. 5A and 5B.

The operation of image processing module 124 including decomposition module 127 and composition module 128 is described in more detail below.

The computer-executable process steps for image processing module 124 may be configured as part of operating system 119, as part of an output device driver, such as a processing driver, or as a stand-alone application program. Image processing module 124 may also be configured as a plug-in or dynamic link library (DLL) to the operating system, device driver or application program. It can be appreciated that the present disclosure is not limited to these embodiments and that the disclosed modules may be used in other environments.

In this example embodiment, image processing module 124 including decomposition module 127 and composition module 128 is stored on fixed disk 45 and executed by CPU 110. In other example embodiments, GPGPU 118 may perform the medical image processing. Specifically, GPGPU 118 may load and execute the modules discussed above. In that regard, since the results of medical image processing are ordinarily written to a new image, the processing of one pixel is ordinarily not dependent on the outcome of processing for another pixel. Accordingly, GPGPU 118 may perform filtering in parallel for all pixels of the image, using each pixel for the target pixel position. Of course, other hardware embodiments outside of a CPU interfaced with a GPGPU are possible, including an integrated circuit (IC) or other hardware, such as DIGIC units.

Figure 3:
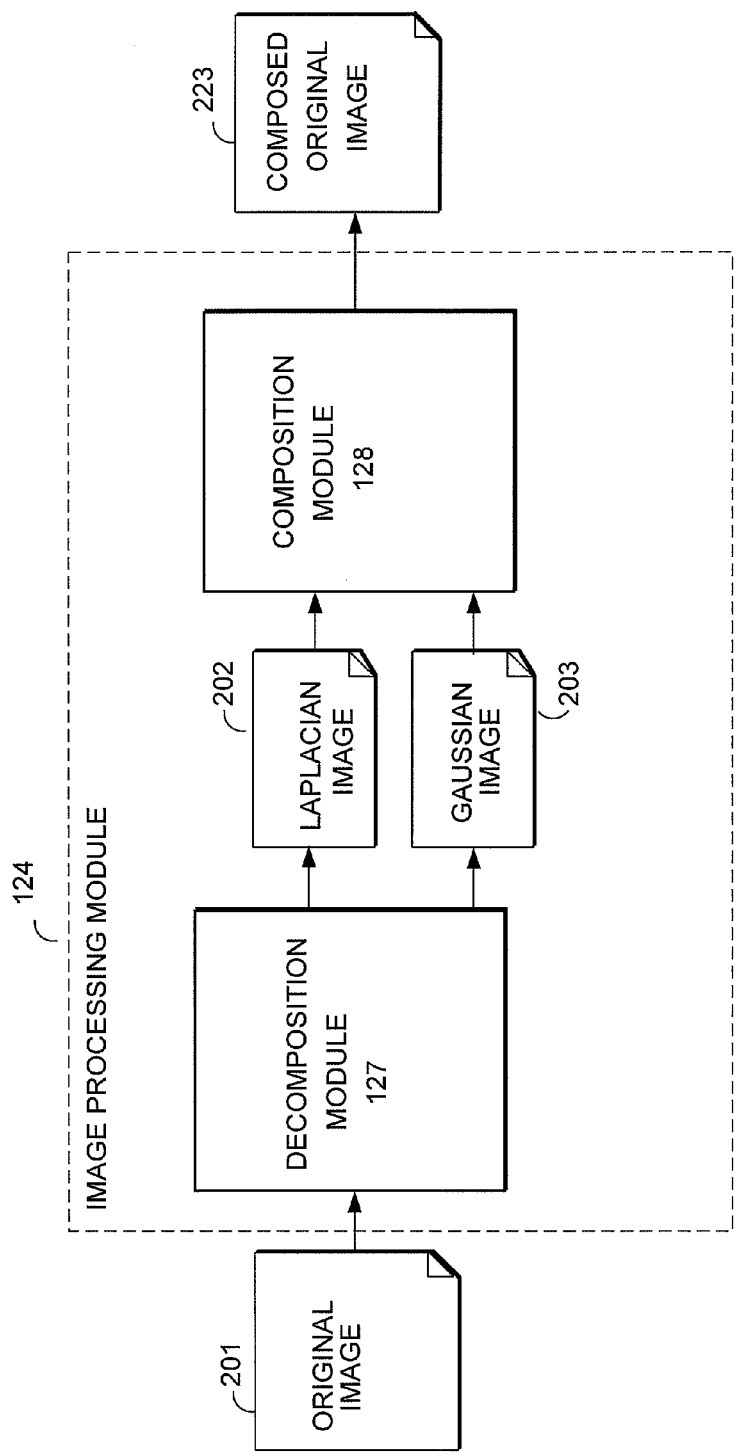
FIG. 3 is a view for explaining an image processing module according to an example embodiment.

FIG. 3 is a view for explaining an image processing module according to an example embodiment. As shown in FIG. 3, image processing module 124 receives medical image data comprising original image 201, processes medical image data such that minute details in original image 201 are typically retained and such that undue blur is typically avoided, and outputs image data comprising composed original image 223.

More specifically, decomposition module 127 accepts medical image data comprising original image 201, and decomposes the medical image data into individual frequencies. As shown in FIG. 3, decomposition module 127 outputs a Laplacian image 202 and a Gaussian image 203. Composition module receives Laplacian image 202 and Gaussian image 203 and reconstructs the image data such that the individual frequencies of the image data are integrated. As shown in FIG. 3, composition module 128 outputs composed original image 223, which is the result of adding the image data comprising Laplacian image 202 to the image data comprising Gaussian image 203.

The view depicted in FIG. 3 has been simplified, in that FIG. 3 shows a single iteration of decomposition module 127 and composition module 128. However, as discussed below, the processes performed by decomposition module 127 and composition module 128 are preferably pyramided and applied repeatedly, in subsequent iterations. Subsequent iterations of decomposition module 127 and composition module 128 are shown in FIGS. 4A and 5A, respectively.

Figure 4A:
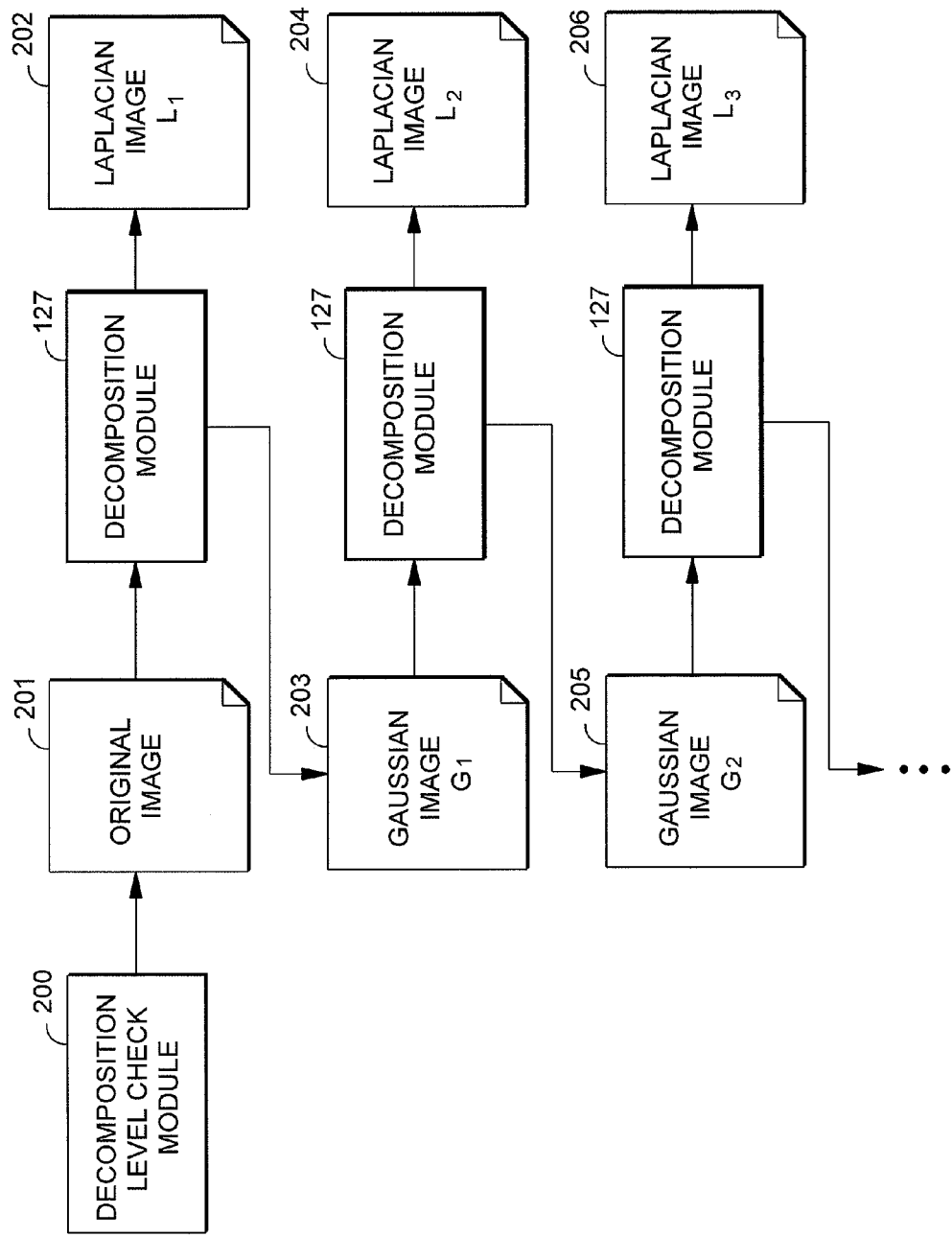
FIG. 4A is a view for explaining decomposition processing performed by an image processing module according to an example embodiment.
Figure 5A:
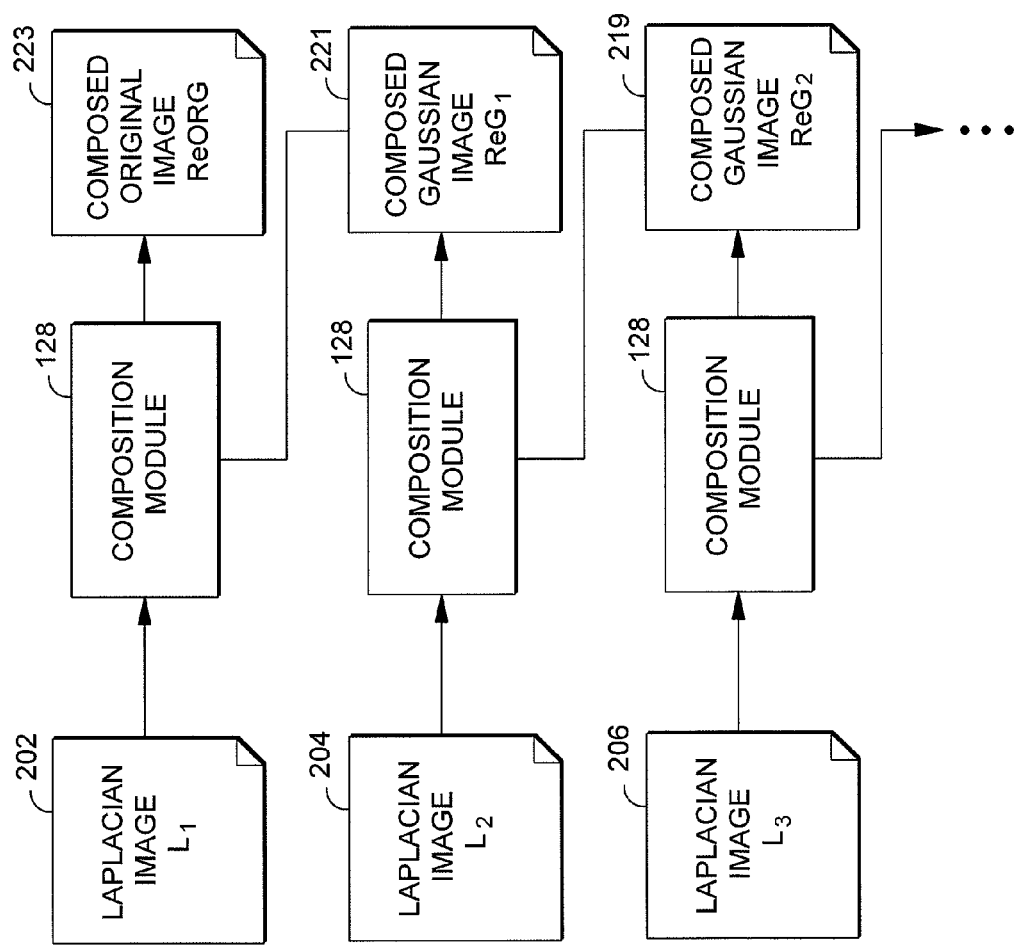
FIG. 5A is a view for explaining composition processing performed by an image processing module according to an example embodiment.

FIG. 4A is a view for explaining decomposition processing performed by an image processing module according to an example embodiment. As previously mentioned, decomposition module 127 included in image processing module 124 is constructed to decompose medical image data, such that the image data is separated into individual frequencies. More specifically, as shown in FIG. 4A, decomposition module 127 receives, as input, medical image data for pixels of a medical image (e.g., original image 201 and Gaussian images 203 and 205), and outputs decimated image data (e.g., Gaussian images 203 and 205), as well as difference image data (e.g., Laplacian images 202, 204 and 206).

Before decomposition module 127 decomposes the medical image data, decomposition level check module 200 determines the number of levels of decomposition that are to be performed by decomposition module 127. More specifically, as shown in FIG. 4A, decomposition level check module 200 is constructed to determine the number of times that the medical image data will be decomposed by decomposition module 127. In this embodiment, the number of iterations to be performed by decomposition module 127 is selected by a user. In the alternative, the user can select the final size of the decimated image, and decomposition level check module 200 determines how many iterations must be performed by decomposition module 127 in order to achieve the selected size. In another alternative, the parameter may be generated by the image processing system or may be based on the original size of the medical image.

Turning to the operation of decomposition module 127, original image 201 comprising medical image data for pixels of a medical image of an anatomical feature is provided to decomposition module 127 for decomposition processing during a first iteration. During this first iteration, decomposition module 127 outputs both decimated image data comprising Gaussian image 203 and difference image data comprising Laplacian image 202. The pixel resolution of the decimated image data comprising Gaussian image 203 is approximately one half of the pixel resolution of the image data for original image 201. Gaussian image 203 is then provided to decomposition module 127 as input at the second level of decomposition processing, and during this second iteration decomposition module 127 outputs both decimated image data comprising Gaussian image 205 and difference image data comprising Laplacian image 204. The pixel resolution of the decimated image data comprising Gaussian image 205 is approximately one half of the pixel resolution of the image data for Gaussian image 203. Gaussian image 205 is then provided to decomposition 127 as input, and during this third iteration both a Gaussian image (not shown) and Laplacian image 206 are output by decomposition module 127. The decomposition process performed by decomposition module 127 is pyramided and applied repeatedly in subsequent iterations, until the number of iterations determined by decomposition level check module 200 is reached.

Figure 4B:
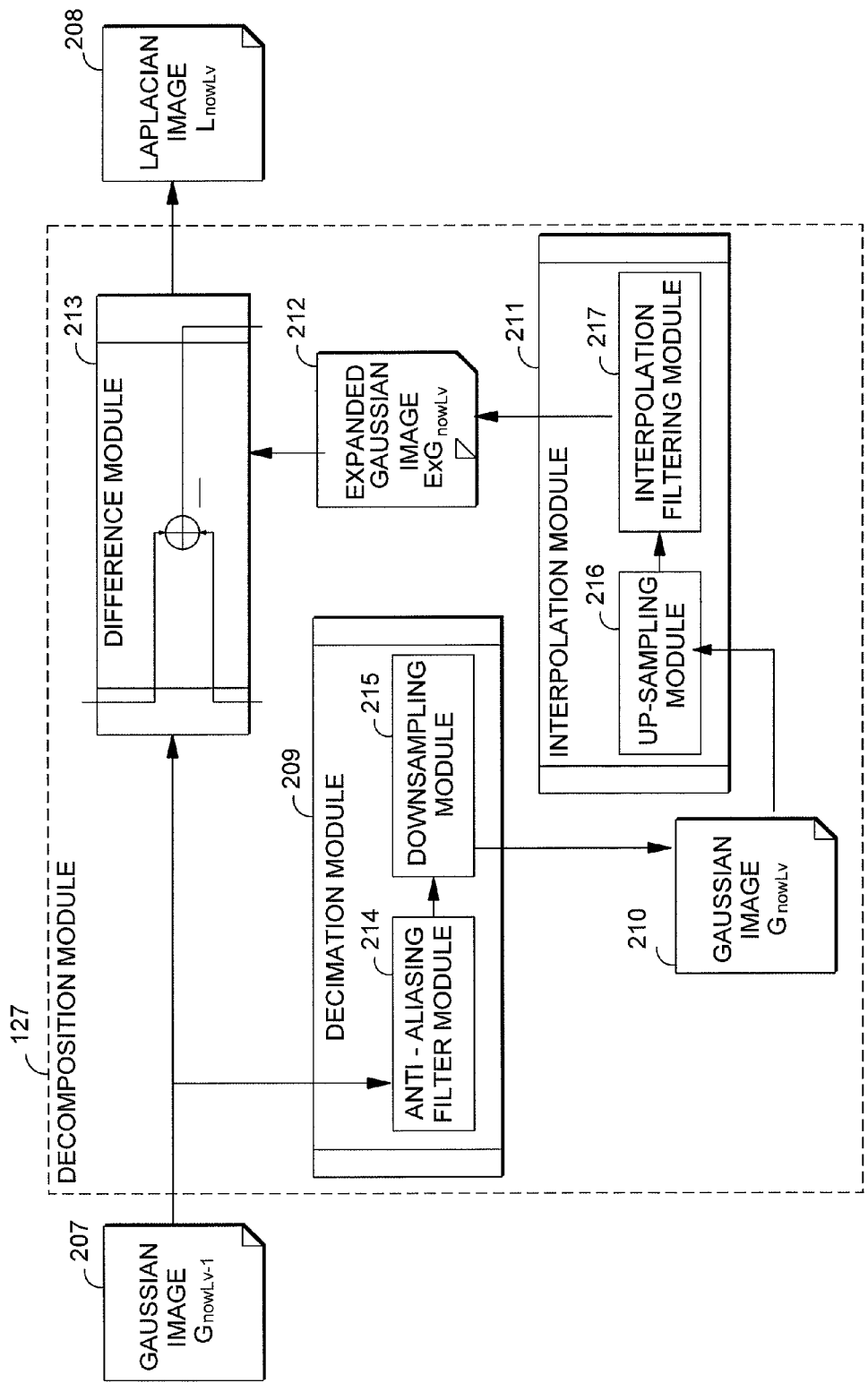
FIG. 4B is a view for explaining a decomposition module according to an example embodiment.

FIG. 4B is a view for explaining sub-modules of decomposition module 127 in more detail. As shown in FIG. 4B, decomposition module 127 includes decimation module 209, interpolation module 211 and difference module 213.

Decimation module 209 is constructed to receive, as input, medical image data comprising a Gaussian image 207, and to output decimated image data comprising a Gaussian image 210. Depending on the level of iteration, medical image data comprising Gaussian image 207 is comprised of any one of medical image data comprising original image 201, medical image data comprising Gaussian image 203 and medical image data comprising Gaussian image 205 shown in FIG. 4A. Likewise, depending on the level of iteration, the decimated image data comprising Gaussian image 210 is comprised of any one of medical image data comprising Gaussian images 203 and 205.

Thus, at the first iteration of decomposition module 127, Gaussian image 207 is comprised of image data for the original medical image, such as original image 201 shown in FIG. 4A. As previously mentioned, the decomposition process performed by decomposition module 127 is preferably pyramided and applied repeatedly, in subsequent iterations. During such subsequent iterations, Gaussian image 207 is comprised of decimated image data which is output by the previous iteration of decomposition module 127, such as Gaussian images 203 and 205 shown in FIG. 4A.

Decimation module 209 includes anti-aliasing filter module 214 and downsampling module 215. Anti-aliasing filter module 214 is constructed to receive, as input, medical image data comprising Gaussian image 207, and to apply an anti-aliasing filter to the medical image data comprising Gaussian image 207 so as to obtain filtered image data. The anti-aliasing filter is comprised by a first filter kernel having weights that define an anti-aliasing filter. In this embodiment, the first filter kernel consists of a 3×3 filter kernel. An example method of determining the weights for the 3×3 anti-aliasing filter kernel is described in more detail below with respect to FIG. 6.

Downsampling module 215 is constructed to receive, as input, the filtered image data from anti-aliasing filter module 214 and to downsample the filtered image data so as to obtain decimated image data comprising Gaussian image 210. The pixel resolution of the decimated image data comprising Gaussian image 210 is approximately half of the pixel resolution of the image data for Gaussian image 207.

Interpolation module 211 is constructed to receive, as input, decimated image data comprising Gaussian image 210, and to output interpolated image data comprising expanded Gaussian image 212. Depending on the level of iteration, decimated image data comprising Gaussian image 210 is any one of medical image data comprising Gaussian image 203 and medical image data comprising Gaussian image 205 shown in FIG. 4A. The pixel resolution of interpolated image data comprising expanded Gaussian image 212 is approximately equal to the pixel resolution of decimated image data comprising Gaussian image 207.

Interpolation module 211 includes upsampling module 216 and interpolation filter module 217. Upsampling module 216 is constructed to receive the decimated image data comprising Gaussian image 210 from downsampling module 215 and to upsample the decimated image data. The resulting image data is then provided to interpolation filtering module 217, which is constructed to apply an interpolation filter to the upsampled image data so as to obtain interpolated image data comprising expanded Gaussian image 212. The interpolation filter is comprised by a second filter kernel having weights that define an interpolation filter, and the size of the second filter kernel is larger than the size of the first filter kernel. More specifically, in this embodiment, the second filter kernel for the interpolation filter consists of a 5×5 filter kernel, whereas the first filter kernel for the anti-aliasing filter consists of a 3×3 filter kernel.

By using a 3×3 anti-aliasing filter kernel and a 5×5 interpolation filter kernel, it is typically possible to decrease the influence of neighboring pixels, and thereby to retain minute details of the pixel under consideration and thereby the image during processing.

Difference module 213 outputs difference image data which comprises Laplacian image 208. The difference image data is the difference between the interpolated image data 212 received from interpolation module 211 and the medical image data 207.

As previously discussed and as shown in FIG. 4A, the steps of applying an anti-aliasing filter, downsampling filtered image data, upsampling and applying an interpolation filter, and obtaining difference image data are pyramided and applied repeatedly by each of the respective sub-modules until the required number of iterations (e.g., as determined by decomposition level check module 200) is reached.

Images output from decomposition module 127, such as Laplacian images 202, 204, 206 and 208 are provided to composition module 128 for reconstruction, as described below.

In some example embodiments, one or more subsequent image processing techniques are applied to each of the decomposed images output from decomposition module 127, before the images are supplied to composition module 128. These processes include, for example, noise reduction, artifact reduction, tone processing, local contrast correction and edge enhancement. In this way, each such process can be tailored to the particular frequency of the anatomical image data to which the process is being applied.

FIG. 5A is a view for explaining composition processing performed by an image processing module according to an example embodiment. As previously mentioned, composition module 128 included in image processing module 124 is constructed to reconstruct medical image data, such that the individual frequencies of the image data are integrated. More specifically, as shown in FIG. 5A, composition module 128 accepts, as input, difference image data (e.g., Laplacian images 202, 204 and 206) together with reconstructed image data (e.g., composed images 219 and 221), and outputs reconstructed image data (e.g., composed images 219, 221 and 223).

In more detail, during the first iteration of composition module 128, composition module 128 accepts, as input, the decimated image data output by the final iteration of decomposition module 127 (i.e., the decimated image data with the lowest resolution) together with the difference image data output by the final iteration of decomposition module 127, for example, Laplacian image 206. In this example, composition module 128 outputs reconstructed image data comprising composed Gaussian image 219 during the first iteration. Composed Gaussian image 219 is then provided to composition module 128 as input together with difference image data comprising Laplacian image 204 during the second iteration, and composition module 128 outputs composed Gaussian image 221. Composed Gaussian image 221 is then provided to composition module 128 together with difference image data comprising Laplacian image 202, and composition module 128 outputs composed original image 223 during this third and final iteration. Composed original image 223 has approximately the same pixel resolution as the original image 201. Thus, the number of iterations performed by composition module 128 is typically equal to the number of iterations determined by decomposition level check module 200 and performed by decomposition module 127.

Figure 5B:
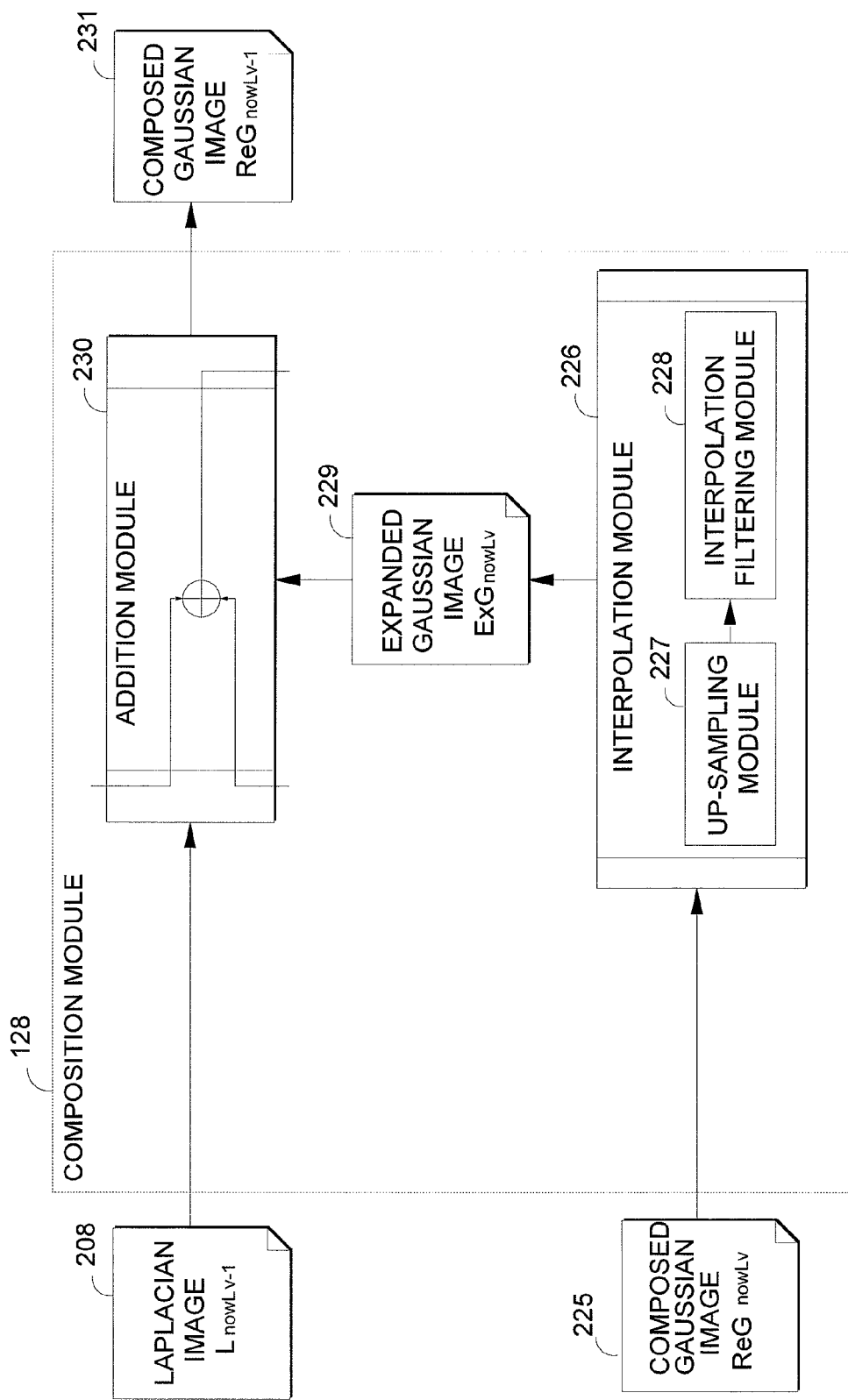
FIG. 5B is a view for explaining a composition module according to an example embodiment.

FIG. 5B is a view for explaining sub-modules of composition module 128 in more detail. As shown in FIG. 5B, composition module 128 includes addition module 230 and interpolation module 226.

During the first iteration of composition module 128, interpolation module 226 is constructed to receive, as input, the decimated image data output by the final iteration of decomposition module 127. During subsequent iterations of composition module 128, interpolation module 226 receives reconstructed image data comprising composed Gaussian image 225 from composition module 128, and outputs interpolated image data comprising expanded Gaussian image 229. Depending on the level of iteration, reconstructed image data comprising composed Gaussian image 225 is comprised of any one of image data comprising composed Gaussian images 219 and 221 shown in FIG. 5A.

Interpolation module 226 includes upsampling module 227 and interpolation filtering module 228. More specifically, upsampling module 227 is constructed to upsample composed Gaussian image 225, and interpolation filtering module 228 is constructed to interpolate the upsampled image data so as to obtain interpolated image data comprising expanded Gaussian image 229.

Addition module 230 is constructed to receive, as input, difference image data comprising Laplacian image 208 from decomposition module 127, together with expanded Gaussian image 229 output by interpolation module 226. Depending on the level of iteration, the difference image data comprising Laplacian image 208 is comprised of any one of difference image data comprising Laplacian images 202, 204 and 206 shown in FIG. 5A. Addition module 230 outputs addition image data which comprises composed Gaussian image 231. Depending on the level of iteration, the addition image data comprising composed Gaussian image 231 is comprised of any one of addition image data comprising composed Gaussian image 219, composed Gaussian image 221 and composed original image 223 shown in FIG. 5A. The addition image data comprising composed Gaussian image 231 is the result of adding the difference image data comprising Laplacian image 208 to the interpolated image data comprising expanded Gaussian image 229.

As previously discussed and as shown in FIG. 5A, the steps of upsampling and applying an interpolation filter, and obtaining addition image data are pyramided and applied repeatedly by each of the respective modules until the number of iterations determined by decomposition level check module 200 is reached, and composed original image 223 is output.

Figure 6:
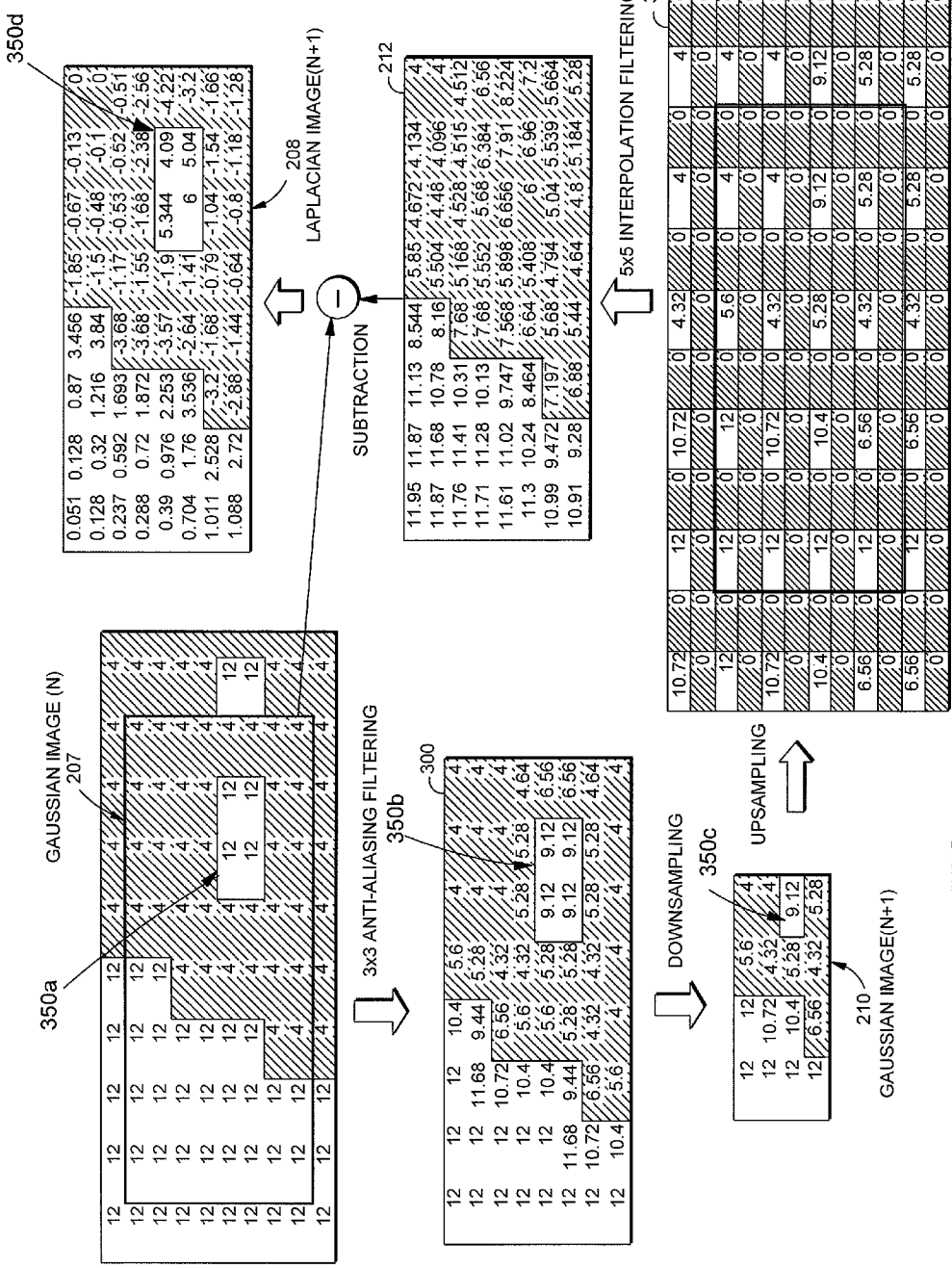
FIG. 6 is a representational view depicting decomposition processing of a medical image according to an example embodiment.

FIG. 6 is a representational view depicting decomposition processing of a medical image according to the example embodiment shown in FIG. 4B. As shown in FIG. 6, Gaussian image 207 is comprised of image data for each pixel of a medical image. Anti-aliasing filter module 214 applies an anti-aliasing filter to the medical image data so as to obtain filtered image data 300. Downsampling module 215 downsamples filtered image data 300 so as to obtain decimated image data 210. As shown in FIG. 6, the pixel resolution of decimated image data 210 is one half of the pixel resolution of the image data for Gaussian image 207. Upsampling module 216 upsamples decimated image data 210 so as to obtain upsampled image data 310. Interpolation filtering module 217 applies an interpolation filter to upsampled image data 310 so as to obtain interpolated image data 212. As shown in FIG. 6, the pixel resolution of the interpolated image data comprising image 212 is equal to pixel resolution of the image data comprising Gaussian image 207. Difference module 213 obtains difference image data 208, wherein the difference image data is the difference between interpolated image data 212 and the image data comprising Gaussian image 207, at each of the respective pixels thereof.

In the example depicted in FIG. 6, the anti-aliasing filter applied to Gaussian image 207 is comprised by a 3×3 filter kernel having weights that define an anti-aliasing filter. Generally, the weights for the 3×3 anti-aliasing filter kernel for the anti-aliasing filter are expressed as follows:

$$[k1*[k1,k2,k1],k2*[k1,k2,k1],k1*[k1,k2,k1]] \qquad \text{Equation (1)}$$

where the weights satisfy conditions as follows:

$$k1 = (1/4)*w2 \qquad \text{Equation (2)}$$

$$k2 = 1 - k1*2 \qquad \text{Equation (3)}$$

$$0.8 <= w2 <= 1.3 \qquad \text{Equation (4)}$$

$$57\% <= wt\,\% <= 84\% \qquad \text{Equation (5)}$$

wherein wt % is the weight of the pixel under consideration, and is defined as follows:

$$wt\% = 100*(4*k1*k2+k2*k2) \quad \text{Equation (6)}$$

In particular, in the example shown in FIG. 6, w2=0.8 for the 3×3 anti-aliasing filter kernel applied to Gaussian image 207, such that the filter kernel is expressed as:

$$[[0.04,0.12,0.04],[0.12,0.36,0.12],[0.04,0.12,0.04]] \quad \text{Equation (11)}$$

In this embodiment, the pixel under consideration is the central pixel of the pixels being processed by image processing module 124. More specifically, when image processing module 124 processes data for a pixel of a medical image, the influence of the surrounding pixels is taken into account. Thus, the weight of the center pixel is determined with respect to the weights of the surrounding pixels. In this embodiment, the weights determined for the pixels to the north, south, east and west of the pixel under consideration are higher than the weights determined for the pixels which are diagonal to the pixel under consideration.

Returning to the example depicted in FIG. 6, the interpolation filter applied to upsampled data 310 is a 5×5 interpolation filter kernel having weights that define an interpolation filter. Generally, the weights for the 5×5 filter kernel for the interpolation filter are expressed as follows:

$$[k1*[k1,k2,k3,k2,k1],k2*[k1,k2,k3,k2,k1],k3*[k1,k2,k3,k2,k1],k2*[k1,k2,k3,k2,k1],k1*[k1,k2,k3,k2,k1]] \quad \text{Equation (7)}$$

where the weights satisfy conditions as follows:

$$k1 = (1/16)*w1 \quad \text{Equation (8)}$$

$$k2 = 1/4 \quad \text{Equation (9)}$$

$$k3 = (1/2) - k1*2. \quad \text{Equation (10)}$$

In the example embodiment shown in FIG. 6, w1=0.8 for the 5×5 interpolation filter kernel, such that the interpolation filter kernel is expressed as:

$$[[0.0025,0.0125,0.02,0.0125,0.0025],[0.0125,0.0625, 0.1,0.0625,0.0125],[0.02,0.1,0.16,0.1,0.02],[0.012 5,0.0625,0.1,0.0625,0.0125],[0.0025,0.0125, 0.02,0.0125,0.0025]] \quad \text{Equation (12)}$$

In other embodiments, w1=1.0.

In this example embodiment, w1 and w2 have no defined mathematical relationship. However, in other embodiments, such a relationship can be defined, such as w2=w1 and w2=0.8*w1. In this way, the weights for both the anti-aliasing filter kernel and the interpolation filter kernel can be controlled by the definition of a single parameter.

As shown in FIG. 6, decomposition module 127 processes medical image data such that minute details in the medical image are visible and such that undue blur is avoided. More specifically, high value data, such as medical image data 350a, medical image data 350b and medical image data 350c, is retained, such that this data is reflected by difference image data comprising Laplacian image 208 (e.g., medical image data 350d), as well as during subsequent iterations of decomposition module 127.

Figure 7:
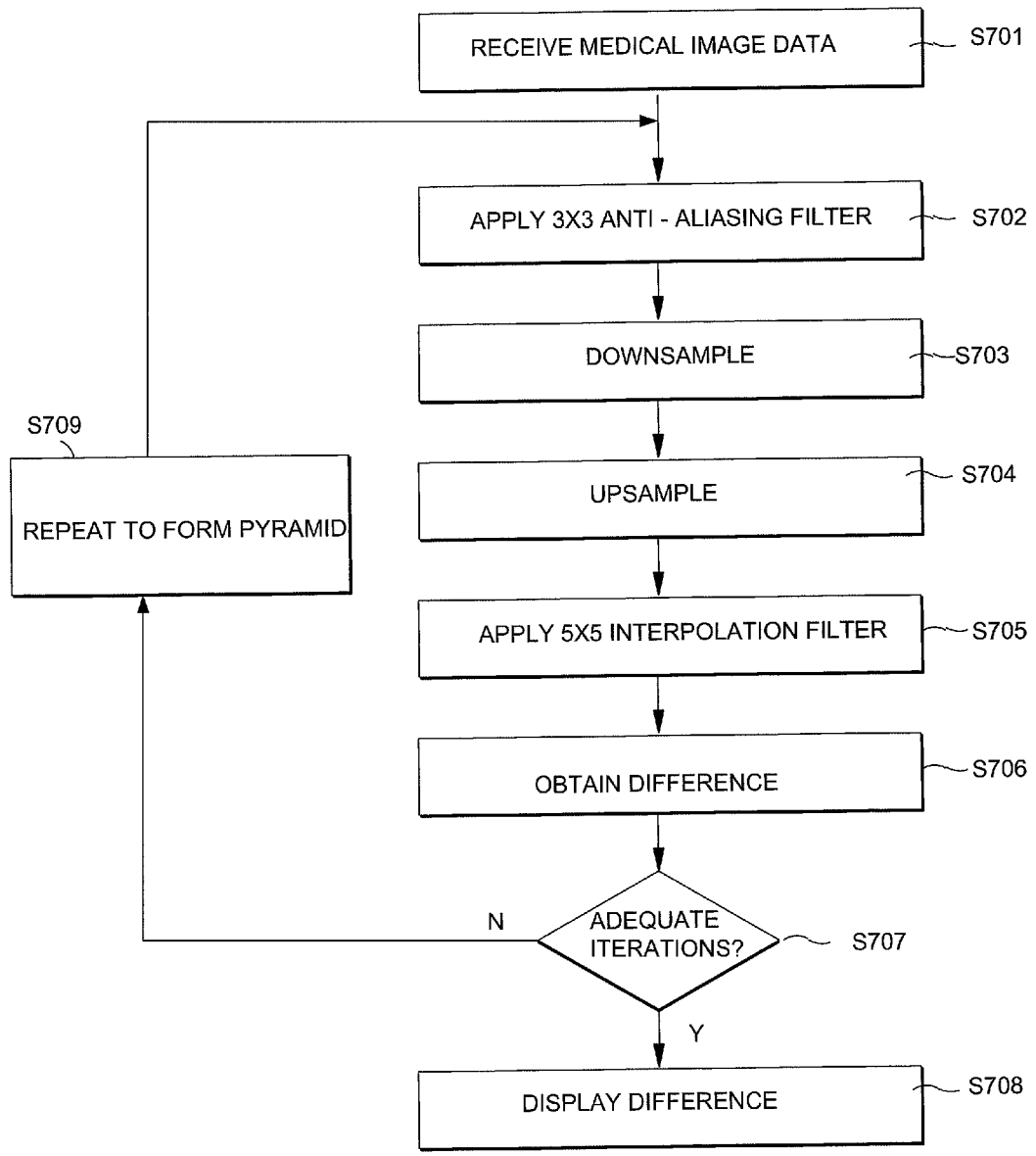
FIG. 7 is a flowchart illustrating an example process for decomposing a medical image.

FIG. 7 is a flowchart illustrating an example process for decomposing a medical image. The process steps shown in FIG. 7 are computer-executable process steps stored on a computer-readable storage medium such as at 124 on fixed disk 45, and are executed by CPU 110 of computer 100, so as to implement image processing module 124 for processing medical image data for pixels of a medical image of an anatomical feature. Briefly, according to the process steps shown in FIG. 7, an anti-aliasing filter is applied to the medical image data so as to obtain filtered image data. The filtered image data is downsampled so as to obtain decimated image data. The pixel resolution of the decimated image data is approximately one half of pixel resolution of the image data for the medical image. The decimated image data is upsampled, and an interpolation filter is applied so as to obtain interpolated image data. The interpolation filter is comprised by a second filter kernel having weights that define an interpolation filter, and the size of the first kernel is smaller than the size of the second filter kernel. The pixel resolution of the interpolated image data is approximately equal to pixel resolution of the medical image data for the medical image. Difference image data between the interpolated image data and the medical image data for the medical image is obtained at each of the respective pixels thereof; and the difference image data is displayed.

In more detail, in step S701, anti-aliasing filter module 214 receives medical image data comprising Gaussian image 207. As previously discussed, medical image data 125 comprises image data for pixels of a medical image of an anatomical feature. In this embodiment, the medical image data is comprised of radiological or digital radiological (DR) image data of an anatomical feature having a resolution of 12 bits per pixel. Alternatively, the medical image can be comprised of computed tomography (CT) image data of an anatomical feature, a positron emission tomography (PET) image data of an anatomical feature, a magnetic resonance imaging (MRI) or nuclear magnetic resonance imaging (NMRI) image data of an anatomical feature, or sonogram image data of an anatomical feature obtained by ultrasonography.

In step S702, anti-aliasing filter module 214 applies an anti-aliasing filter to the medical image data comprising Gaussian image 207. The anti-aliasing filter is comprised by a first filter kernel having weights that define an anti-aliasing filter. In particular, the anti-aliasing filter applied to Gaussian image 207 is comprised by a 3×3 filter kernel, where the filter kernel is expressed as shown in Equation (11).

In step S703, downsampling module 215 receives the filtered image data output by anti-aliasing filter module 214 and downsamples the filtered image data so as to obtain decimated image data. The decimated image data output by downsampling module 215 comprises Gaussian image 210.

In step S704, the decimated image data comprising Gaussian image 210 is upsampled by upsampling module 216, and interpolation module 211 interpolates the data output from upsampling module 216 in order to obtain interpolated image data in step S705. The interpolated image data comprises expanded Gaussian image 212. More specifically, interpolation module 211 applies an interpolation filter to the upsampled image data, wherein the interpolation filter is comprised by a second filter kernel having weights that define an interpolation filter. In particular, the interpolation filter applied to the upsampled image data is comprised by a 5×5 filter kernel, where the filter kernel is expressed as shown in Equation (12).

In step S706, difference module 213 receives medical image data comprising Gaussian image 207 and interpolated image data comprising expanded Gaussian image 212 from interpolation module 211. Difference module 213 obtains the difference between the interpolated image data 212 and the medical image data 207 for the medical image, at each of the respective pixels thereof. The difference image data output by difference module 213 comprises Laplacian image 208.

In step S707, it is determined whether the required number of iterations (e.g., as determined by decomposition level check module 200) has been reached. If it is determined in step S707 that the adequate number of iterations has not been reached ("N" at S707), the flow proceeds to step S709 where steps S702 to S706 are pyramided and applied repeatedly by each of the respective sub-modules until the adequate number of iterations is reached.

If it is determined in step S707 that the adequate number of iterations has been reached ("Y" at S707), the difference image data output from difference module 213 is displayed in step S708. As described above, the difference image data is the difference between interpolated image data 212 output by interpolation module 211 and the medical image data 207 for the medical image. In this way, the minute details included in the medical image data comprising Gaussian image 207 are generally retained and reflected in the displayed difference image data, such that the medical image can be examined for clinical study.

Subsequently, in this embodiment, the difference image data is supplied to composition module 128 for reconstruction. In other embodiments, the difference image data is further processed before being provided to composition module 128, for example, in order to reduce noise and enhance edges.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for processing medical image data for pixels of a medical image of an anatomical feature, comprising:
    applying an anti-aliasing filter to the medical image data so as to obtain filtered image data, wherein the anti-aliasing filter is comprised by a first filter kernel having weights that define an anti-aliasing filter;
    downsampling the filtered image data so as to obtain decimated image data, wherein pixel resolution of the decimated image data is one half of pixel resolution of the image data for the medical image;
    upsampling and applying an interpolation filter to the decimated image data so as to obtain interpolated image data, wherein the interpolation filter is comprised by a second filter kernel having weights that define an interpolation filter, wherein pixel resolution of the interpolated image data is equal to pixel resolution of the medical image data for the medical image, and wherein the size of the first kernel is smaller than the size of the second filter kernel; and
    obtaining difference image data between the interpolated image data and the medical image data for the medical image, at each of the respective pixels thereof,
    wherein the method further comprises pyramided and repeated application of the steps of applying an anti-aliasing filter, downsampling filtered image data, upsampling and applying an interpolation filter, and obtaining difference image data, and
    wherein the steps of applying an anti-aliasing filter, downsampling filtered image data, upsampling and applying an interpolation filter, and obtaining difference image data are repeated for a number of iterations which is based on a user selection of the number of iterations or a user selection of a final size of the decimated image.

2. A method according to claim 1, wherein the first filter kernel consists of a 3×3 filter kernel.

3. A method according to claim 2, wherein the weights for the 3×3 filter
    kernel for the anti-aliasing filter are expressed as follows:

$$[k1*[k1,k2,k1],k2*[k1,k2,k1],k1*[k1,k2,k1]],$$

wherein the weights satisfy conditions as follows:

$$k1=\tfrac{1}{4}*w2;$$

$$k2=1-k1*2;$$

$$0.8<=w2<=1.3; \text{ and } 57\%<=\text{wt }\%<=84\%,$$

wherein wt %=100*(4*k1*k2+k2*k2), and wherein wt % is the weight of the pixel under consideration.

4. A method according to claim 1, wherein the second filter kernel consists of a 5×5 filter kernel.

5. A method according to claim 4, wherein the weights for the 5×5 filter kernel for the interpolation filter are expressed as follows:

$$[k1*[k1,k2,k3,k2,k1],k2*[k1,k2,k3,k2,k1],k3*[k1,k2,k3,k2,k1],k2*[k1,k2,k3,k2,k1],k1*[k1,k2,k3,k2,k1]],$$

and wherein the weights satisfy conditions as follows:

$$k1=\tfrac{1}{16}*w1;$$

$$k2=\tfrac{1}{4}; \text{ and}$$

$$k3=1; 2-k1*2.$$

6. A method according to claim 5, wherein w1=0.8.

7. A method according to claim 5, wherein w1=1.0.

8. A method according to claim 1, wherein the medical image data is comprised of radiological or digital radiological (DR) image data of an anatomical feature.

9. A method according to claim 1, wherein the medical image is comprised of computed tomography (CT) image data of an anatomical feature.

10. A method according to claim 1, wherein the medical image data is comprised of a positron emission tomography (PET) image data of an anatomical feature.

11. A method according to claim 1, wherein the medical image data is comprised of magnetic resonance imaging (MRI) or nuclear magnetic resonance imaging (NMRI) image data of an anatomical feature.

12. A method according to claim 1, wherein the medical image data is comprised of sonogram image data of an anatomical feature obtained by ultrasonography.

13. A method according to claim 1, further comprising obtaining composed medical image data, wherein the composed medical image data is obtained by
    upsampling and applying an interpolation filter to the medical image data so as to obtain second interpolated image data, and
    obtaining addition image data between the difference image data and the second interpolated image data.

14. A method according to claim 1, further comprising applying one or more subsequent image processing techniques to the difference image data, wherein the subsequent image processing techniques include at least noise reduction, artifact reduction, tone processing, local contrast correction and edge enhancement.

15. A module stored on a non-transitory computer-readable memory medium for processing medical image data for pixels of a medical image of an anatomical feature, comprising:
    an anti-aliasing module constructed to apply an anti-aliasing filter to the medical image data so as to obtain filtered image data, wherein the anti-aliasing filter is comprised by a first filter kernel having weights that define an anti-aliasing filter;
    a downsampling module constructed to downsample the filtered image data so as to obtain decimated image data, wherein pixel resolution of the decimated image data is one half of pixel resolution of the image data for the medical image;

an interpolation module constructed to upsample and apply an interpolation filter to the decimated image data so as to obtain interpolated image data, wherein the interpolation filter is comprised by a second filter kernel having weights that define an interpolation filter, wherein pixel resolution of the interpolated image data is equal to pixel resolution of the medical image data for the medical image, and wherein the size of the first kernel is smaller than the size of the second filter kernel; and a difference module constructed to obtain difference image data between the interpolated image data and the medical image data for the medical image, at each of the respective pixels thereof, wherein the anti-aliasing module, the downsampling module, the interpolation module and the difference module respectively pyramid and repeat the steps of applying an anti-aliasing filter, downsampling filtered image data, upsampling and applying an interpolation filter, and obtaining difference image data, wherein the steps of applying an anti-aliasing filter, downsampling filtered image data, upsampling and applying an interpolation filter, and obtaining difference image data are repeated for a number of iterations which is based on a user selection of the number of iterations or a user selection of a final size of the decimated image.

16. An apparatus for processing medical image data for pixels of a medical image of an anatomical feature, the apparatus comprising:

a computer-readable memory constructed to store computer-executable process steps; and a processor constructed to execute the computer-executable process steps stored in the memory;

wherein the process steps stored in the memory include computer-executable process steps to:

apply an anti-aliasing filter to the medical image data so as to obtain filtered image data, wherein the anti-aliasing filter is comprised by a first filter kernel having weights that define an anti-aliasing filter;

downsample the filtered image data so as to obtain decimated image data, wherein pixel resolution of the decimated image data is one half of pixel resolution of the image data for the medical image;

upsample and applying an interpolation filter to the decimated image data so as to obtain interpolated image data, wherein the interpolation filter is comprised by a second filter kernel having weights that define an interpolation filter, wherein pixel resolution of the interpolated image data is equal to pixel resolution of the medical image data for the medical image, and wherein the size of the first kernel is smaller than the size of the second filter kernel; and obtain difference image data between the interpolated image data and the medical image data for the medical image, at each of the respective pixels thereof, wherein the process steps stored in the memory further comprise computer-executable process steps to pyramid and repeat the steps of applying an anti-aliasing filter, downsampling filtered image data, upsampling and applying an interpolation filter, and obtaining difference image data, and wherein the steps of applying an anti-aliasing filter, downsampling filtered image data, upsampling and applying an interpolation filter, and obtaining difference image data are repeated for a number of iterations which is based on a user selection of the number of iterations or a user selection of a final size of the decimated image.

17. A non-transitory computer-readable storage medium on which is stored computer-executable process steps for processing medical image data for pixels of a medical image of an anatomical feature, the process steps comprising:

applying an anti-aliasing filter to the medical image data so as to obtain filtered image data, wherein the anti-aliasing filter is comprised by a first filter kernel having weights that define an anti-aliasing filter;

downsampling the filtered image data so as to obtain decimated image data, wherein pixel resolution of the decimated image data is one half of pixel resolution of the image data for the medical image;

upsampling and applying an interpolation filter to the decimated image data so as to obtain interpolated image data, wherein the interpolation filter is comprised by a second filter kernel having weights that define an interpolation filter, wherein pixel resolution of the interpolated image data is equal to pixel resolution of the medical image data for the medical image, and wherein the size of the first kernel is smaller than the size of the second filter kernel; and obtaining difference image data between the interpolated image data and the medical image data for the medical image, at each of the respective pixels thereof, wherein the process steps further comprise process steps to pyramid and repeat the steps of applying an anti-aliasing filter, downsampling filtered image data, upsampling and applying an interpolation filter, and obtaining difference image data, and wherein the steps of applying an anti-aliasing filter, downsampling filtered image data, upsampling and applying an interpolation filter, and obtaining difference image data are repeated for a number of iterations which is based on a user selection of the number of iterations or a user selection of a final size of the decimated image.

18. A method for processing medical image data for pixels of a medical image of an anatomical feature, comprising:

applying an anti-aliasing filter to the medical image data so as to obtain filtered image data, wherein the anti-aliasing filter is comprised by a first filter kernel having weights that define an anti-aliasing filter, wherein the first filter kernel consists of a 3×3 filter kernel, the weights for the 3×3 filter kernel for the anti-aliasing filter are expressed as follows:

$$[k1*[k1,k2,k1], k2*[k1,k2,k1], k1*[k1,k2,k1]],$$

wherein the weights satisfy conditions as follows:

$$k1 = \frac{1}{4} * w2;$$

$$k2 = 1 - k1*2;$$

$$0.8 <= w2 <= 1.3; \text{ and } 57\% <= wt\% <= 84\%,$$

wherein $wt\% = 100*(4*k1*k2 + k2*k2)$, and wherein $wt\%$ is the weight of the pixel under consideration;

downsampling the filtered image data so as to obtain decimated image data, wherein pixel resolution of the decimated image data is one half of pixel resolution of the image data for the medical image;

upsampling and applying an interpolation filter to the decimated image data so as to obtain interpolated image data, wherein the interpolation filter is comprised by a second filter kernel having weights that define an interpolation filter, wherein pixel resolution of the interpolated image data is equal to pixel resolution of the medical image data for the medical image, and wherein the size of the first kernel is smaller than the size of the second filter kernel;

obtaining difference image data between the interpolated image data and the medical image data for the medical image, at each of the respective pixels thereof; and displaying the difference image data.

19. A method for processing medical image data for pixels of a medical image of an anatomical feature, comprising:

applying an anti-aliasing filter to the medical image data so as to obtain filtered image data, wherein the anti-aliasing filter is comprised by a first filter kernel having weights that define an anti-aliasing filter;

downsampling the filtered image data so as to obtain decimated image data, wherein pixel resolution of the decimated image data is one half of pixel resolution of the image data for the medical image;

upsampling and applying an interpolation filter to the decimated image data so as to obtain interpolated image data, wherein the interpolation filter is comprised by a second filter kernel having weights that define an interpolation filter, wherein pixel resolution of the interpolated image data is equal to pixel resolution of the medical image data for the medical image, and wherein the size of the first kernel is smaller than the size of the second filter kernel, wherein the second filter kernel consists of a 5×5 filter kernel, wherein the weights for the 5×5 filter kernel for the interpolation filter are expressed as follows:

$$[k1*[k1,k2,k3,k2,k1],k2*[k1,k2,k3,k2,k1],k3*[k1,k2,k3,k2,k1],k2*[k1,k2,k3,k2,k1],k1*[k1,k2,k3,k2,k1]],$$

and wherein the weights satisfy conditions as follows:

$k1 = \frac{1}{16} * w1;$ $k2 = \frac{1}{4};$ and $k3 = \frac{1}{2} - k1*2;$ obtaining difference image data between the interpolated image data and the medical image data for the medical image, at each of the respective pixels thereof; and displaying the difference image data.

\* \* \* \* \*